United States Patent [19]

Teza et al.

[11] 4,317,181
[45] Feb. 23, 1982

[54] FOUR MODE MICROCOMPUTER POWER SAVE OPERATION

[75] Inventors: Jeffrey R. Teza, Houston; Kenneth A. Lies, Lubbock, both of Tex.

[73] Assignee: Texas Instruments Incorporated, Dallas, Tex.

[21] Appl. No.: 106,809

[22] Filed: Dec. 26, 1979

[51] Int. Cl.³ .............................................. G06F 1/04
[52] U.S. Cl. .................................... 364/707; 364/900
[58] Field of Search ............... 364/707, 200 MS File, 364/900 MS File

[56] References Cited

U.S. PATENT DOCUMENTS

| | | | |
|---|---|---|---|
| 3,453,601 | 7/1969 | Bogert et al. | 364/707 X |
| 3,941,989 | 3/1976 | McLaughlin et al. | 364/707 |
| 4,218,876 | 8/1980 | Hashimoto et al. | 364/707 X |

*Primary Examiner*—Jerry Smith
*Attorney, Agent, or Firm*—Leo Heiting; Robert D. Marshall, Jr.; Melvin Sharp

[57] ABSTRACT

A calculator having constant memory utilizing a low power microcomputer with on-chip memory capability, and multiple partition power control of circuit groups. Incorporation of a first and second switched negative voltage and a non-switched negative voltage enables the power hungry clocked logic and the display interface and keystroke detect circuitry, to be turned off while power is maintained on the internal static RAM, and on the RAM write logic, digit latches, and R-lines which connect to both the internal RAM, or to selectively connect in combination the first and second switched voltages. In an alternate embodiment, a multiple oscillator, multiple partition system is controlled to provide an off-mode, display only mode (low frequency oscillator), a process only mode, and a display and process mode, thereby optimizing power dissipation to system requirements. Thus, semi-non-volatile memory (constant memory) capability, power down standby, and display only, capabilities may be achieved. Power consumption less than conventional CMOS is obtainable.

6 Claims, 19 Drawing Figures

| CALCULATOR | MODES / OPERABLE STATE | FIRST POWER SWITCHING MEANS | SECOND POWER SWITCHING MEANS |
|---|---|---|---|
| OFF-STATE | OFF | OFF | OFF |
| ON-STATE | DISPLAY AND KEY DETECT | OFF | ON |
| ON-STATE | PROCESS KEYSTROKE | ON | ON |
| ON-STATE | PROCESS TIMER | ON | ON |

TABLE OF OPERATIVE STATE MAPPING  Fig. 4

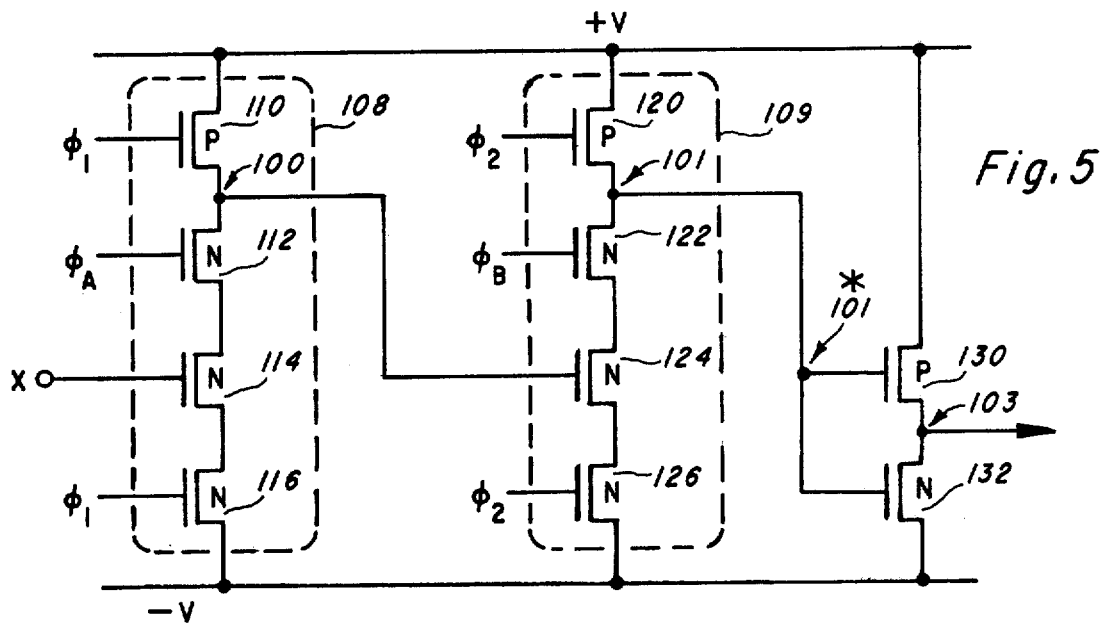
Fig. 5
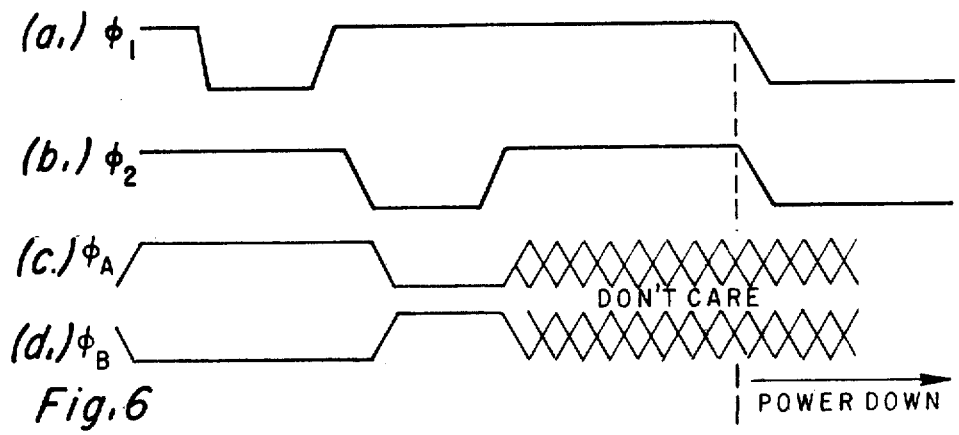
Fig. 6
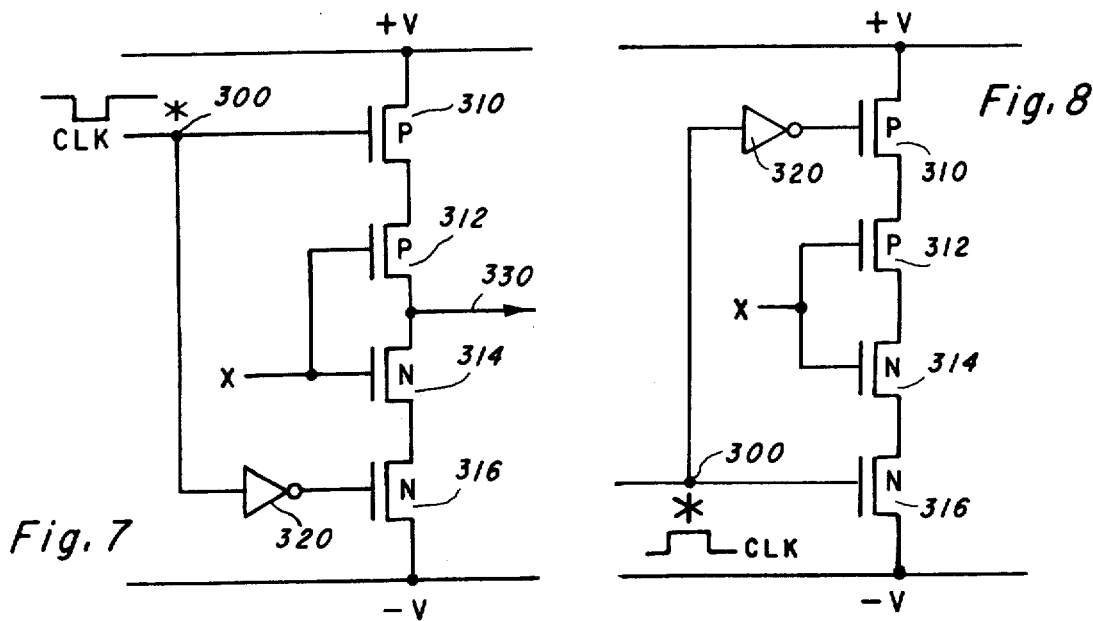
Fig. 7
Fig. 8

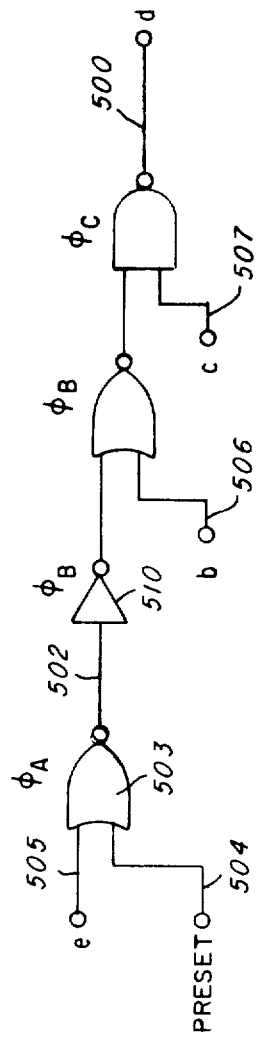
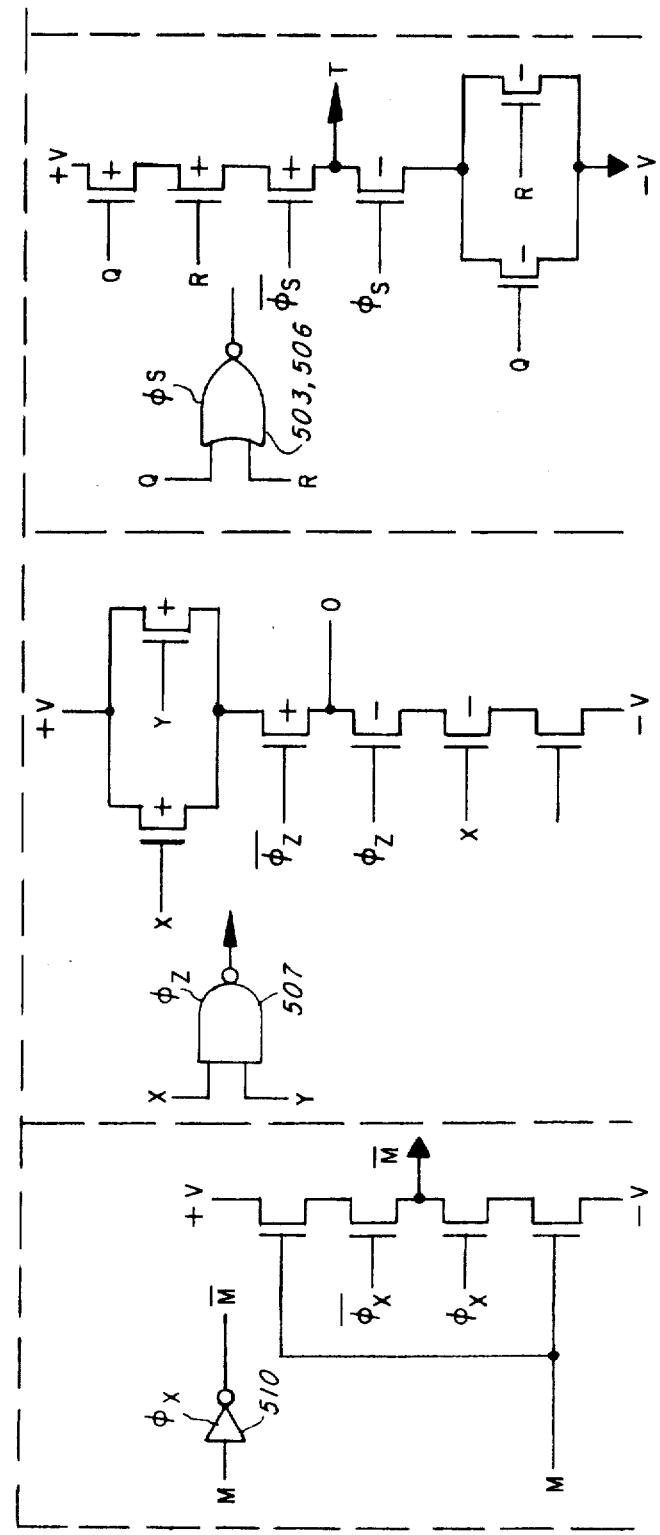
Fig.13

FOUR MODE MICROCOMPUTER POWER SAVE OPERATION

BACKGROUND OF THE INVENTION

This invention relates to calculators and more particularly to calculators having a multiple mode power controller. Multimode power control is a significant advancement over turning off the processor circuitry between keystrokes as described in co-pending application, Ser. No. 106,430, filed Dec. 26, 1979 for "Turn Off Processor Between Key Strokes", by Graham Tubbs, assigned to the same assignee as the present invention. That invention, as does the present invention, addresses the problem of how to minimize power dissipation while maintaining full operational capability. Some calculators, such as that disclosed in the "Turn Off Processor Between Key Strokes" patent application cited above, have essentially three (3) mode systems: off mode, display and processing mode, or display mode. Furthermore, prior calculators system differ from the present invention in that a single main clock oscillator was utilized which was kept on in the display mode, such as described in the above cited co-pending application on "Turn Off Processor Between Key Strokes". Other calculators are essentially two-mode machines, having an off mode and a process and display mode. The main oscillator is always on so long as the calculator is on in the two-mode machine.

SUMMARY OF INVENTION

The present invention goes beyond the two or three mode machines and provides a four mode system which may be in an off state, a process only state which turns off the display oscillator and saves power, a display only state which turns off the main oscillator and saves considerable power, and a display and process state which turns off the display oscillator to save power and which allows full access to inputs and output and gives complete processing capability while providing a visible display.

The multimode power conservation controller of the present invention is applicable to clocked CMOS, NMOS, VMOS, bipolar systems, and to ratioless CMOS structures such as described in co-pending application Ser. No. 46,888, filed June 8, 1979, by Jeff Southard et al, for "Ratioless Logic", assigned to the assignee of the present invention.

The calculator of the present invention utilizes a multipartitioned power distribution system and a four state power controller to selectively provide clocked signals to selected circuit groups, and thereby control power, by gating system clocks to selected circuit groups in response to externally provided input stimuli, such as user inputs, for example keyboard key depressions or digital interface signals from within or from another integrated circuit. In a preferred embodiment, the multi-partitioned four state control system comprises: a main oscillator; a display oscillator; a display clock generator coupled to the display oscillator; a display interface coupled to the display clock generator, the display interface for coupling to an external display; a main clock generator coupled to the main oscillator; and a processor coupled to the main clock generator, the processor coupled to other circuit groups within the calculator system; a keyboard; and a controller means coupled to the display oscillator, the main oscillator, the display clock generator, the main clock generator, the display interface, the processor, and the keyboard. The controller provides four state clock mode control so as to conserve system power by selectively enabling the display oscillator, the processor main oscillator, the display clock generator, and the main clock generator, in response to receiving predefined combinations of instruction codes from the processor and operative key codes from the keyboard, so as to effect a display only mode wherein the display oscillator and display clock generator are enabled, and the main oscillator and main clock generator are disabled; a display and process mode wherein the main oscillator, display clock generator, and main clock generator are enabled and the display oscillator disabled; a processor only mode wherein the main oscillator and main clock generator are enabled and the display oscillator and display clock generator are disabled; and an off mode wherein the display oscillator, the display clock generator, the main oscillator and the main clock generator are all disabled.

BRIEF DESCRIPTION OF THE DRAWINGS

The novel features believed characteristic of the invention are set forth in the appended claims. The invention itself, however, as well as other features and advantages thereof, will be best understood by reference to the following detailed description of illustrative embodiments, when read in conjunction with the accompanying drawings, wherein:

FIG. 5 is a detailed schematic diagram detailing critical off-state DC current pathway nodes in a ratioless CMOS structure embodiment of the chip 20 of FIGS. 3a-d;

FIGS. 6(a)-(d) are representations of voltages as a function of time which illustrate circuit operation in a ratioless CMOS embodiment of the invention in the calculator;

FIGS. 7 and 8 are detailed schematic diagrams detailing critical off-state DC current pathway nodes in a clocked CMOS structure embodiment of the chip 20 of FIGS. 3a-c utilizing the invention;

FIG. 13 is a detailed schematic of an alternate embodiment of the circuit group 50 of FIG. 3a and more specifically of a clocked CMOS circuit group such as described with reference to FIGS. 7 and 8 with the improvement of controller output logic level in the standby mode.

DETAILED DESCRIPTION OF THE INVENTION

Figure 1:
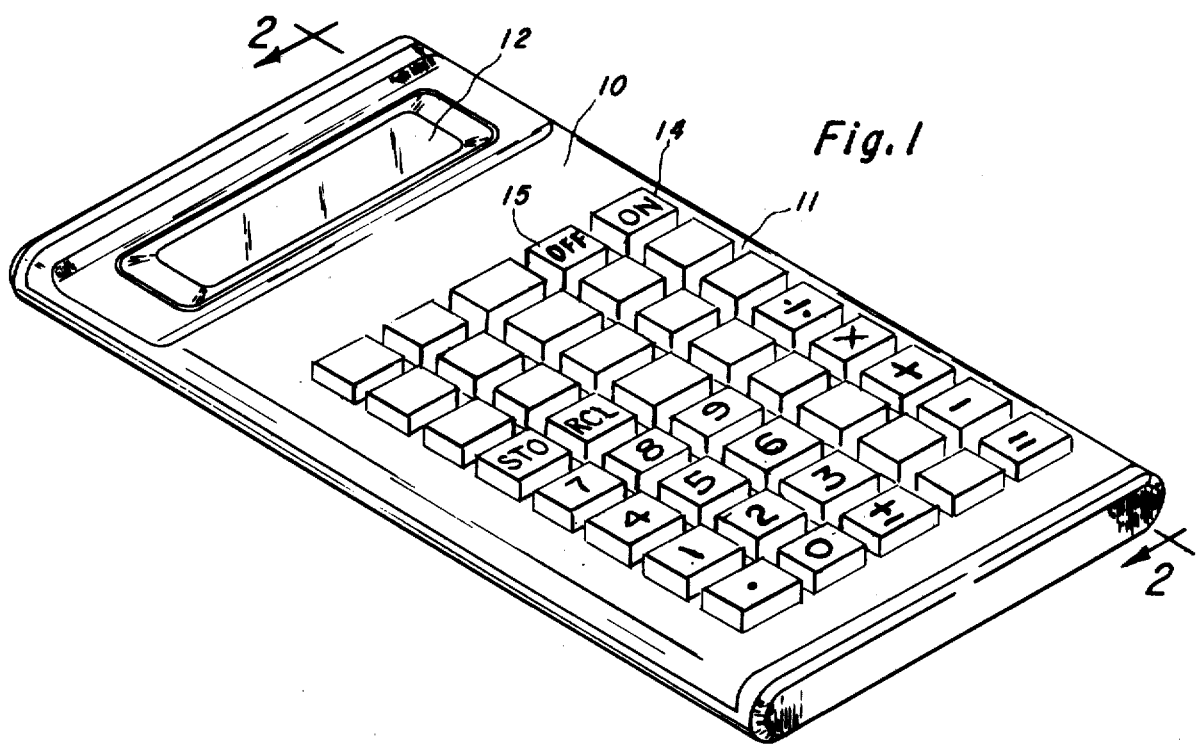
FIG. 1 is a pictorial view of a handheld calculator in which multi-partition switched power designs embodying the invention may be utilized advantageously.

Referring to FIG. 1, a typical handheld electronic calculator which incorporates the invention is shown. The calculator comprises a case or housing 10 of molded plastic or the like, with a keyboard 11 and a display 12. The keyboard includes number keys 0-9, a decimal point key, and several standard operation keys such as +, −, =, ×, ÷, etc. In some embodiments, the calculator system could perform a variety of additional functions, so keys such as $\sqrt{X}$, $\sqrt[X]{Y^x}$, SIN, COS, TAN, LOG, %, LN, STO, RCL, etc., may be included in the keyboard 11. Additional watch functions and corresponding keys may be added. The display 12 has a number of digits of seven segment type, with decimal points. Alternatively, alphanumeric display digits of nine, eleven or thirteen segments, or a 5×7 dot matrix may be used. Displays of 8, 10 or 12 digits are commonly used and these may also include exponents for scientific notation, and minus sign for both mantissa and exponent. The display usually comprises liquid crystal devices (LCD), although visible light emitting diodes, vacuum florescent displays, or a gas discharge panel, for example, may also be used with appropriate interface circuitry. The calculator is a self-contained unit having a power supply in the form of a battery or batteries within the housing 10, although an AC adapter may be attached, as well as a battery charger if rechargeable batteries are used.

In place of the usual ON-OFF slide switch which has been used in prior calculators, the calculator of FIG. 1 includes a push-button, momentary-contact-on switch 14 and a like push-button OFF switch 15. The switches 14 and 15 are exactly like the remainder of the keyswitches in the keyboard 11 in that they are single-pole single-throw normally open "Form A" switches which remain closed only as long as pressure is manually applied. In contrast, the usual slide switch would remain closed when moved to the ON position, supplying voltage from the battery to the electronic circuitry of the calculator continuously until the switch is manually moved to the OFF position.

Figure 2:
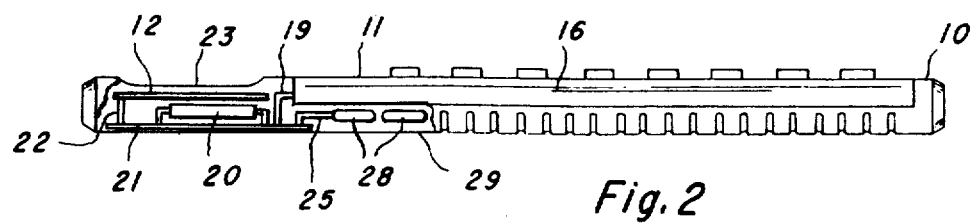
FIG. 2 is an elevational view in section of the calculator of FIG. 1 taken along the line 2—2 of FIG. 1.

In FIG. 2, the general form of the internal structure of the calculator is seen. The keyboard 11 includes an X-Y matrix keyboard device 16 suitably of the type shown in U.S. Pat. No. 4,005,293 issued Jan. 25, 1977, assigned to Texas Instruments Incorporated. About ten to thirteen wires 19 extend from the end of keyboard device 16 for connection to the electronic circuitry of the calculator. An integrated circuit calculator chip 20 contains all of the memory, arithmetic and control circuitry, as will be described. The chip 20 is encased in a standard twenty-eight pin dual-in-line plastic package for example, which is commonly used in the semiconductor industry. Depending upon the complexity of the calculator, and the multiplexing scheme used, the number of pins in the package could be more or less, and also other chip packaging and mounting techniques may be used. The chip 20 is connected to a printed or etched circuit board 21 by soldering the pins to conductors on the board 21, as are the wires 19. The display 12 is mounted on a small PC board 22, beneath a plastic lens 23 which enhances the visibility of the display. The PC board 22 is mounted on the board 21 by pins soldered to conductors on the board which make the desired connections from the chip 20 to the display 12. A pair of silver oxide or equivalent batteries 28, are mounted in a compartment behind a door 29 in the housing 10, and is connected to the PC board 21 by wires 25 which are soldered to the PC board at one end and engage terminals of the battery by connectors at the other end.

The simplicity of the calculator is apparent from FIG. 2. It consists of a housing, a keyboard device, a chip, a display device, two small PC boards, and a battery. No components are needed on the board 21 except the chip 20, i.e., no resistors capacitors, transistors, drivers or any other devices, although such components may be used to add features to the chip 20.

Figure 3:
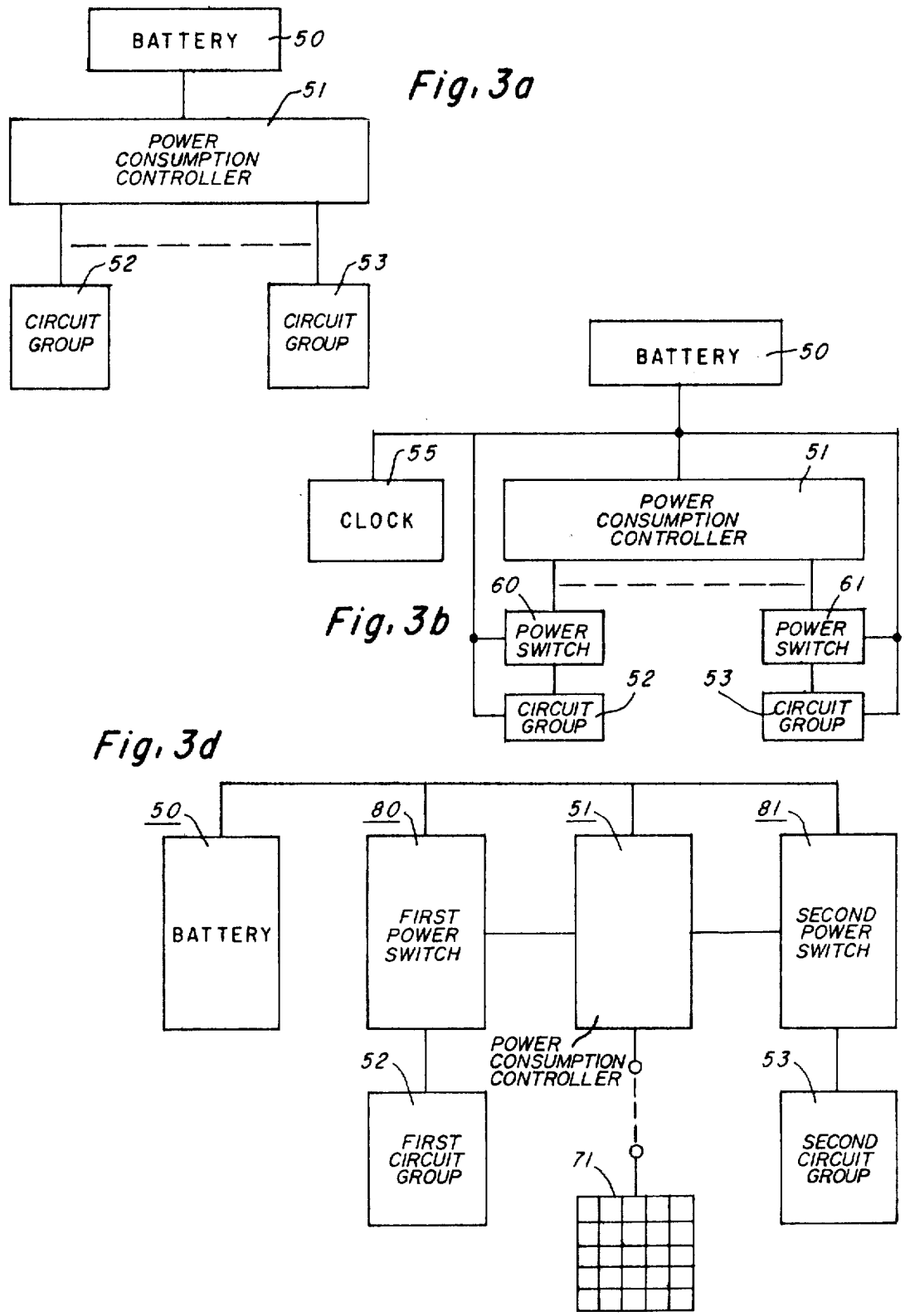
FIG. 3a-d are electrical block diagrams of alternate embodiments of a multi-partition power conservation design of one type of MOS/LSI calculator chip utilizing the invention, in particular the chip 20 of FIG. 1.

Referring to FIG. 3a, a block diagram of the system within the chip 20 of FIG. 2 is shown. This system may be a digit processor chip, such as that described in U.S. Pat. Nos. 3,991,305 or 4,014,013. A power source 50, a battery in the preferred embodiment is connected to power consumption controller 51. The power consumption controller 51 is connected to a plurality of circuit groups including a first circuit group 52 and a second circuit group 53. In a preferred embodiment, the first circuit group 52 comprises a processor, and the second circuit group 53 comprises the display interface circuitry. The power consumption controller 51 selectively activates either one or both of the first circuit group 52 and the second circuit group 53 to an active on state, or selectively deactivates the circuit groups to an off state of low power dissipation stand-by mode responsive to the calculator operative state as explained with reference to FIG. 4, infra. Alternately, the battery 50 may selectively be connected to the circuit groups, including the first circuit group 52 and the second circuit group 53. Referring to FIG. 3b, a preferred detailed embodiment of the power conservation system of FIG. 3a is shown. The battery 50 is connected to the power consumption controller 51, to the clock oscillator means 55, to a first power switching means 60, to a second power switching means 61, to the first circuit group 52, and to the second circuit group 53. The first power switching means 60 is interposed between the power consumption controller 51 and the first circuit group 52 and connected therebetween. In a similar manner, the second power switching means 61 is interposed between the power consumption controller 51 and the second circuit group 53 and connected therebetween. The power consumption controller 51 outputs a first control signal to the first power switching means 60 and a second control signal to the second power switching means 61 so as to selectively activate the first and second power switching means 60 and 61, respectively, with an excitation source signal from the clock oscillator means 55, or to provide an inactive control signal to each of the first and second power switching means 60 and 61, respectively, thereby disabling the power switching means 60 and 61, responsive to the operative state of the calculator system as described with reference to FIG. 4, below. First power switching means 60, in response to receiving the active state first control signal output from the power consumption controller 51, selectively provides clock signals to the first circuit group 52, thereby activating the dynamic circuitry contained therein and affecting a power dissipating active state responsive to an activated state of the first power switching means 60. Alternatively, when the first power switching means 60 is disabled by an inactive first control signal output from the power conservation means 51, no active clock signals are output from the first power switching means 60 to the first circuit group 52, thereby forcing the first circuit group 52 to an inactive standby non-clocked state, virtually eliminating power dissipation within the first circuit group 52. In a similar manner, the second power switching means 61 responsive to whether the power consumption controller 51 second control signal output is active or inactive provides activated cycling or inactivated non-cycling clock signals, respectively, to the second circuit group 53, to effect an on state of power dissipation or an off standby state of virtually no power dissipation, respectively, responsive to the operative state of the calculator system as determined by the power consumption controller 51.

Referring to FIG. 3c, a detailed block diagram of the system of FIG. 3b is shown. The battery 50 is connected to an independent circuit group 70, the first circuit group 52, which includes a processor means, the first power switching means 60, the power consumption controller 51, the second power switching means 61, the second circuit group 53, which includes a display means and the clock oscillator means 55. The clock oscillator means 55 is connected to the independent circuit group 70, the first power switching means 60, which includes a processor clock generator means, and the second power switching means 61, which includes an input/output (I/O) clock generating means. The independent circuit group 70 comprises logic which is an active ready state so long as power is provided to it from the battery 50. The independent circuit group 70 has an input for connection to a keyboard 71 having an on-key, and an off-key, and a plurality of operation keys, each of the keys of the keyboard means being individually operable to provide respective keystroke signals for as long as the key is depressed. The independent circuit group 70 may be part of the power consumption controller 51, or may be a separate circuit group within the integrated circuit. The independent circuit group 70 provides an operation keystroke signal output to the power consumption controller 51, responsive to detecting key operation from the keyboard means 71, and provides an output to the power consumption controller 51 indicative of the respective keystroke detected. The power consumption controller 51 includes an enabling means which provides a first control signal output to the first power switching means 60 and a second control signal output to the second power switching means 61, responsive to the received operation keystroke output from the independent circuit group 70. The power consumption controller 51 assumes an active state upon receiving an on-key stroke signal and assumes a standby state upon receiving an off-key stroke signal. Power consumption controller 51 provides an output to the input/output (I/O) clock generator means of the second power switching means 61, when in the active state, enabling the I/O clock generator means, and provides an output to the processor clock generating means of the first power switching means 60, when the power consumption controller 51 is in the active state and has received a particular operation keystroke signal from the independent circuit group 70. The first power switching means 60 when receiving the enabled output from the power consumption controller 51 responds to the received output from the clock oscillator means 55 so as to generate clocks output to the processor means of the first circuit group 52. In a similar manner, the second power switching means 61 provides clock output signals derived from the received output from the clock oscillator means 55 in response to receipt of the enabled output from the power consumption controller 51. The first circuit group 52 and the second circuit group 53 are comprised of clocked logic which only dissipates power when the received clocks are in an active cycling state. Thus, by selectively controlling the clocks to the first and second circuit groups 52 and 53, respectively, the power consumption controller 51 effectively controls power consumption in the integrated circuit 20.

The first and second power switching means 60 and 61 in response to receiving control output signals from the power consumption controller 51, effectively connect and disconnect the power to the first and second circuit groups 52 and 53, respectively, by means of a two-fold technique. First, critical node power down DC pathways must be ferretted out of the design prior to manufacture so as to prevent loss of power through leakage when clocking is halted and the circuit groups are in a standby off mode. The critical node DC pathways are compensated for by circuit design techniques. Secondly, system clocks of the first and second circuit groups 52 and 53 are cycled so as to activate and provide power to the respective circuit group to effect an on-mode, or the system clocks are disabled so as to force the respective circuit group to a stand-by non-power consuming off mode, effectively disconnecting power.

Referring to FIG. 3d, an alternative embodiment of the system of FIG. 3b is shown. The battery 50 is connected to a first power switching means 80, the power consumption controller 51 and a second power switching means 81. The power conservation means 51 is connected to the first power switching means 80, and the second power switching means 81. Alternatively, the first power switching means 80 and the second power switching means 81 may form an integral part of the power conservation means. The first power switching means 80 is connected to the first circuit group 52. Alternatively, the first power switching means 80 may form an integral part of the first circuit group 52. The first power switching means 80 is interposed between the battery means 50 and the first circuit group 52, for selectively coupling the battery means 50 to the circuit group 52 in response to receiving an active first control signal output from the power consumption controller 51. Similarly, the second power switching means 81 is interposed between the battery means 50 and the second circuit group 53, for coupling the battery means 50 to the second circuit group 53 in response to receiving an active second control signal output from the power consumption controller 51. Alternatively, the second power switching means 81 may form an integral part of the second circuitry group 53. The power consumption controller 51 is operable to provide the respective control signals to the first and second power switching means 80 and 81 in response to the operative state of the calculator system. As described above with reference to FIG. 3c an independent circuit group 70, either within the power consumption controller 51 or a separate circuit group connected to the battery 50, has an input for connection to the keyboard means 71, and is responsive to the received keystroke signals therefrom for determining operative state selection in the power consumption controller 51. The power switching means 80 and 81, may be comprised of integrated power switches or other power coupling means when used in conjunction with either static or dynamic logic in the first and second circuit groups 52 and 53.

In a preferred embodiment, the independent circuit group 70 also includes a non-volatile memory as described in co-pending application Ser. No. 047,431, by Harper et al, filed June 11, 1979, for "Calculator with Constant Memory", which is assigned to the assignee of the present application and now abandoned. The second circuit group 53 may additionally comprise circuitry as described in co-pending application Ser. No. 046,887, by Leach et al, filed June 8, 1979, and now U.S. Pat. No. 4,264,963 for "Static Latches for Storing Display Segment Information" which is assigned to the assignee of the present application.

Figure 4:
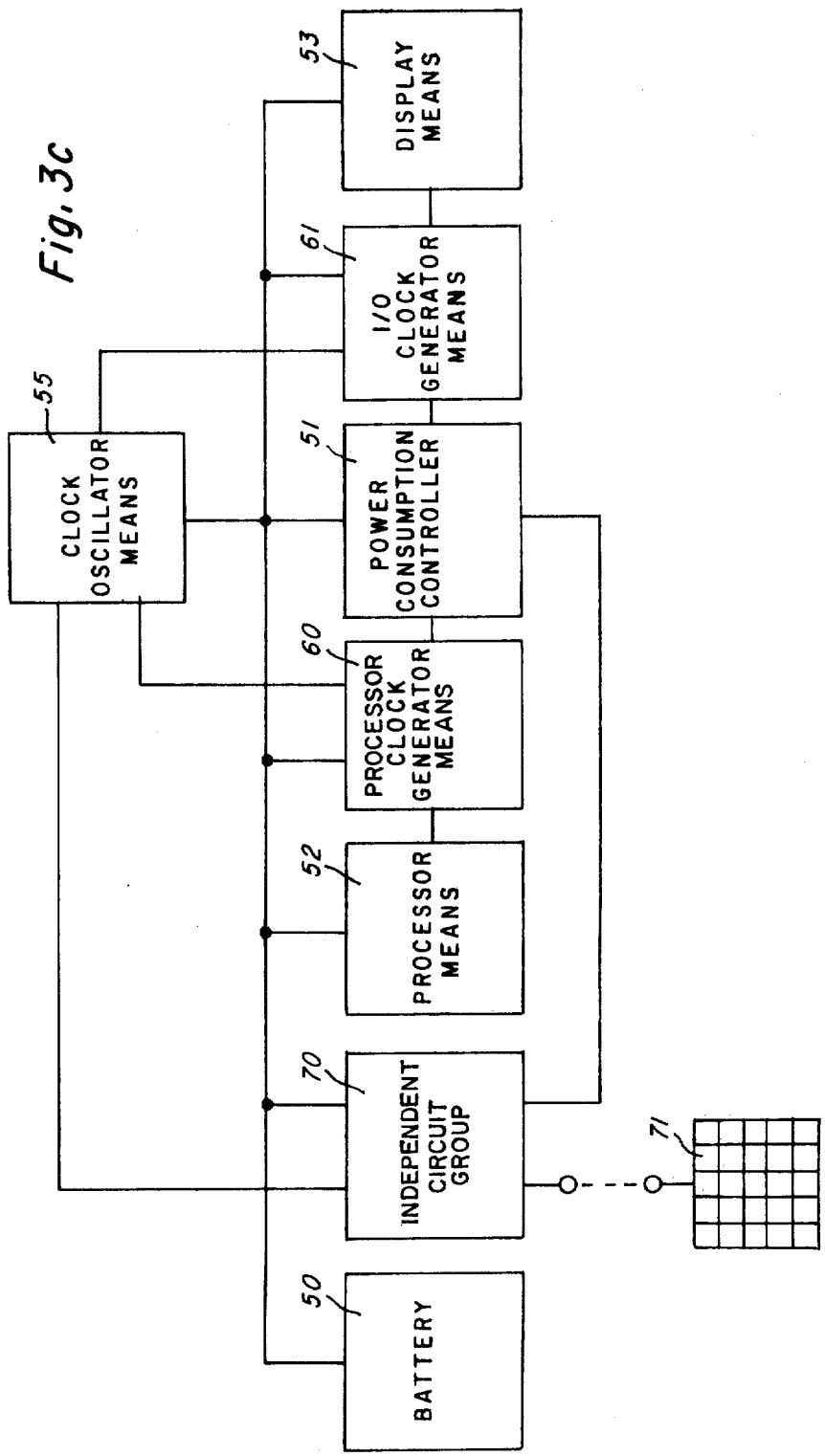
FIG. 4 is an operative state mapping table of one embodiment of the present invention as shown in FIG. 3.

The interaction of the blocks from FIGS. 3a-d is better understood by reference to the table of FIG. 4, which provides a state table mapping of the operative modes of the power consumption controller 51 of FIGS. 3a-d. As seen in FIG. 4, when the calculator is in the off-state, the power consumption controller 51 disables a first clock gating means and the second clock gating means connected to the first and second power switching means 60 and 61 (80, 81 in FIG. 3d), respectively, resulting in an off-mode. When the calculator is in the on-state, one of three power consumption controller modes may result. Initially upon power up, as well as between keystroke processing (as will be described), the power consumption controller 51 outputs the enabled second clock gating signal to the second power switching means 61 so as to provide system clocks to the second circuit group 53 thereby maintaining a display corresponding to the most recent display register output from the processor of the first circuit group 52. This mode of the power controller, the display and key detect mode, concurrently disables the first power switching means 60 to conserve power consumption. When a key is depressed, the keystroke processor of the independent logic group 70 outputs an enabled keystroke process control signal to the power controller 51 which outputs the enabled first clock gating signal to the first power switching means 60, and outputs the enabled second clock gating signal to the second power switching means 61. In this keystroke processing and display output mode, all areas of the integrated circuit calculator chip are active in a power consuming state. Upon completion of the keystroke processing, the first control signal output to the power consumption controller 51 is disabled, causing the power consumption controller 51 to disable the control signal to the first power switching means 60 and to return to the display and key detect mode as shown in the table FIG. 4. Additionally, in an alternate embodiment, timing circuitry may be contained in the independent circuit group 70 so as to respond to a timer interrupt output (such as in a watch or stopwatch), and provide an output to the power consumption controller 51 so as to activate it to output the enabled first clock gating signal to the first power switching means 60, which thereby enables the first circuit group 52, so as to process the timer interrupt. Additionally, in this mode, the power consumption controller 51 outputs the enabled second clock gating signal to the second power switching means 61 so as to enable the second circuit group 53. In either the keystroke detect and display mode or the keystroke processing and display mode, the detection of an off-key operative signal causes the system to go to the off-mode.

Thus, the embodiment of the invention as set forth in FIGS. 3a-d, as explained with reference to FIG. 4, maintains an active and valid display throughout the calculator on-state while the power hungry clocked logic and processor circuitry of the first circuit group 52 of FIGS. 3a-d are selectively connected so as to consume system power only when needed to process keystroke or timer inputs. The resulting system greatly reduces power consumption. The system may be designed with static, ratioless CMOS, clocked CMOS, or other clocked logic design structures.

In FIG. 5, a preferred embodiment of the system in FIGS. 3a-c is shown utilizing a ratioless CMOS structure as described in co-pending application Ser. No. 46,888, filed June 8, 1979, by Tubbs et al, "Ratioless Logic." An inverter within one of the circuit groups is analyzed with reference to FIG. 5 to describe the aforementioned two-fold technique of (1) critical node DC pathway design analysis and compensation, and (2) clocked power switching techniques. A first inverter stage 108, is comprised of four MOS transistors in series connection: a P-channel transistor 110 and N-channel transistors 112, 114 and 116. The gates of the transistors 110 and 116 are connected to a first control clock O. The gate of isolation transistor 112 is connected to a first stage isolation control clock $\phi_A$, and the gate of the input responsive transistor 114 is connected to an external input from the previous stage or from an external source outside the circuit. The source-drain path of the first transistor 110 is connected between a positive supply voltage +V and a circuit output node 100 which connects to the gate of an input transistor 124 of a second inverter stage 109. The second stage 109 is structured equivalent to the first stage 108 with clocks $\phi_2$ and $\phi_B$ replacing clocks $\phi_1$ and $\phi_A$, and with a precharge transistor 120 connected between the +V supply and an output connection node 101 of the second stage 109. For purposes of discussion, assume that the circuit of FIG. 5 is within the first circuit group 52 of FIG. 3b. When the first power switching means 52 is enabled, the system clocks $\phi_1$, $\phi_2$, $\phi_A$ and $\phi_B$ begin cycling. The clocks $\phi_1$ and $\phi_2$ periodically precharge the output connection nodes 100 and 101. The clocks $\phi_1$, $\phi_A$, and $\phi_2$, $\phi_B$ connect the nodes 100 and 101 so as to be selectively discharged in response to the input at each stage via isolation transistors 112, and 122, input stage transistors 114, and 124, and discharge transistors 116 and 126, of the first and second circuit stages, respectively. The output nodes 100 and 101 are isolated from discharge by transistors 112, 122, respectively. When the first power switching means 60 of FIG. 3b is disabled, the associated clock sources $\phi_1$, $\phi_2$, $\phi_A$ and $\phi_B$ become inactive non-cycling and, without preventive design, potential DC current pathways may result which consume power. Due to the structure of the ratioless CMOS circuit stage, it does not form a direct DC current pathway within the confines of its own structure in a power down mode. However, where the output node connection 101 of the second circuit stage 100 is connected to the inputs of a conventional CMOS inverter stage comprised of transistors 130 and 132 as shown in FIG. 5, problem pathways may exist. During normal circuit operation in the active (ON) mode, the voltage at either node 101 is approximately at the +V or −V voltage level, enabling either transistor 132 or 130, respectively, so as to cause the node 103 to be connected to the +V or −V voltage supply rail. However, when the associated clock circuitry is powered down, the voltage levels at node 101 may degrade sufficiently so as to enable both transistors 130 and 132, thereby providing a direct DC current pathway between the +V supply and the −V supply resulting in power dissipation. By proper design of the precharge transistors 110 and 120 and by proper off-state clock level selection, when the first power switching means is in the power down off mode, the voltages at the output connection nodes 100 and 101 are in essence tied to the +V supply rail, and only transistor 132 is enabled, transistor 130 being disabled, thereby preventing a direct DC current pathway from resulting. The above discussion is equally applicable to the second power switching means 61 and the second circuit group 53.

Referring now to FIG. 6 in conjunction with FIG. 5, the operation of the power down control system may be better understood. When $\phi_1$ goes negative, to the −V supply voltage, transistor 110 is enabled which charges the output node 100 to the +V voltage level. When $\phi_1$ goes positive, transistor 110 is disabled and transistor 116 is simultaneously enabled, which will isolate the node 100 from the +V rail. When the isolation transistor 112 is enabled by $\phi_4$ and input transistor 114 is enabled by an input X, the output at node 100 may discharge via transistor 116 to the −V voltage rail responsive to the input X. The operation of the second circuit stage 109 is identical to that as described with reference to the first circuit stage 108 except that the precharge clock $\phi_2$ is separate from the subsequent to the control clock $\phi_1$ of the first circuit stage 108 during each clock cycle. At power down, both clocks go negative together and stay at the −V level enabling transistors 110 and 120, and connecting nodes 100 and 101 to the +V supply voltage as required for connection to the subsequent CMOS stage.

When the clocks $\phi_1$ and $\phi_2$ disable transistors 110 and 120, and when either the isolation transistors 112 and 122, or discharge transistors 116 and 126, are disabled, the output voltages at nodes 100 and 101 of circuit stages 108 and 109, respectively, are maintained by means of capacitive storage, in isolation. These voltage levels would normally degrade with time due to stored charge leakage, and where the voltage at output 101 degrades to a point where the voltage level is between the thresholds of the transistors 130 and 132 so as to turn both transistors on, a DC current path would be created that would draw substantial current through it. However, by enabling transistors 110 and 120 (by driving clock $\phi_1$ and $\phi_2$, respectively, to a negative level) the output nodes 100 and 101 will be directly connected to the +V supply voltage. Since a negative voltage level on the $\phi_1$ and $\phi_2$ clocks will disable transistors 116 and 126, respectively, the voltage output at nodes 100 and 101 will be prevented from discharging irrespective of the input to the stage and irrespective of the level of the clock applied to the isolation transistors. Thus, the voltage levels at nodes 100 and 101 will be constant at the +V voltage level in the power down mode. The critical node output 101, which is connected to the input of the static inverter transistor pair 130 and 132, is held at the +V voltage level during power down, thereby preventing a direct DC current path through the transistor pair 130 and 132 during power down. When all the clocks in the system of FIG. 5 are inactive non-cycling (steady state), there are no state changes in the system, and negligible current is drawn. The power controller selectively turns clocks on and off to force circuit stages associated with the selected power switching means to a standby (off) or active (on) state, while preventing off-state DC current pathways.

There are numerous off-state critical DC current paths which can be hidden with in a design, including the ratioless CMOS structure of FIG. 5, and the clocked CMOS structures of FIGS. 7 and 8.

Referring to FIG. 7 a clocked CMOS inverter gate structure is shown. The inverter logic is performed by transistors 312 and 314 which form a CMOS static inverter transistor pair. The input X is connected to the gates of the transistors 312 and 314, the output appearing at the node 330. When a power rail transistor clock signal applied to the node 300 goes to the negative level, the transistors 310 and 316 are enabled so as to connect the static inverter, transistors 312 and 314, to the power supply voltages +V and −V. When the clock appearing at node 300 is maintained at a positive voltage level, +V, the transistors 310 and 316 are disabled, thereby isolating the static inverter pair transistors 312 and 314 from the +V and −V power supply voltages. The clock signal appearing at node 300 is connected directly to the gate of transistor 310, and is connected to an input of an inverter circuit 320 which provides a signal corresponding to a voltage polarity reversal of the input clock to be connected to the gate of the transistor 316. Thus, the transistors 310 and 316 are enabled and disabled in unison.

The clocked CMOS structure, as shown in FIG. 8, is identical to the clocked CMOS inverter gate structure of FIG. 7 except that the inverter 320 of FIG. 7 is removed from between the clock signal at node 300 and the gate of transistor 316 and is instead connected between the clock at the node 300 and the gate of the transistor 310. The relocation of the inverter 320 provides clock polarity reversal from the system shown in FIG. 7.

Thus, in FIG. 8, a positive clock signal level enables transistors 310 and 316, thereby enabling the inverter transistor pair 312 and 314 to function properly. Alternatively, when the clock signal appearing at node 300 is at a negative signal level, the transistors 310 and 316 are disabled, thereby isolating the transistor pair 312 and 314 from power.

An alternate clocked CMOS structure may be constructed with clocked transistors 310 and 316 connected in the center of the series structure and inverter transistors 312 and 314 being connected to the power rails and to the center clocked transistors, as shown with reference to FIG. 13.

Referring back to FIG. 3, the power consumption controller 51 selectively provides for effective power consumption connection and disconnection of the first and second circuit groups 52 and 53, respectively. The concept can be expanded such that the power consumption controller 51 may control a plurality of power switching means which in turn provide for connection of clock signals to a plurality of circuit groups.

Figure 9:
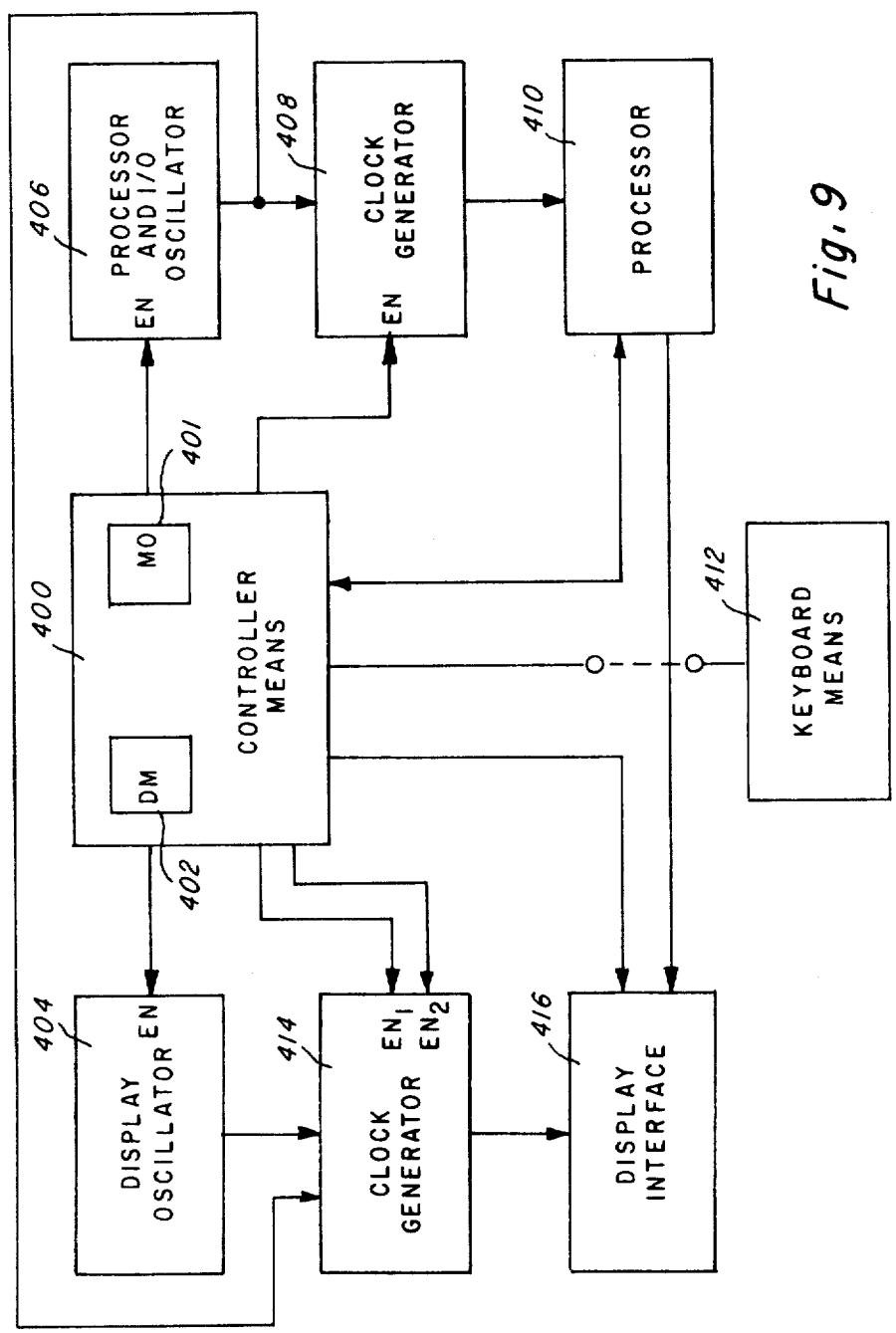
FIG. 9 is a block diagram of a preferred embodiment of a multimode multipartitioned power conservation system.

Referring to FIG. 9, a further improvement over the invention of FIGS. 3a–d is shown. The controller means 400 provides for four different operating modes as described further with reference to FIGS. 10–13 and Tables 1 and 2, infra. In a preferred embodiment, two latches within the controller means 400 determine one of four possible operational modes in response to software and hardware control inputs. The two latches which may be independently set and reset are comprised of a main oscillator latch 401 (MO) and a display mode latch 402 (DM). The controller means 400 is connected to a main oscillator 406 which provides a main oscillator clock output in response to receiving an enable input from the controller 400 for activating the processor and I/O circuitry. A main clock generator 408 is connected to the main oscillator 406 and to the controller means 400 for providing multiphase clock outputs in response to receiving the main oscillator clock output from the main oscillator 406 and an enable input from the controller means 400. Processor means 410 is connected to the main clock generator 408 and to the controller means 400 for processing data received from the controller means 400 in response to receiving the multiphase clock outputs from the main clock generator 408. A keyboard means 412 is connected to the controller means 400. The keyboard means is comprised of an on key, an off key, and a plurality of operation keys, each of the keys being individually operable to provide respective key operation signals for the duration of key depression. A display oscillator 404 is connected to the controller 400 for providing a display oscillator clock output in response to receiving an enable input from the controller 400, for activating display interface circuitry. A display clock generator 414 is connected to the display oscillator 404 and to the controller means 400 for selectively providing multiphase clock outputs in response to receiving the clock output from the display oscillator 404 and an enable input from the controller means 400. A display interface 416 is connected to the display clock generator 414 and to the controller means 400 for selectively providing outputs representative of the information to be displayed corresponding to the data received from the processor means 410 in response to receiving the multiphase clock outputs from the display clock generator 414. The controller means 400 selectively provides enable outputs, to the display oscillator 404, and the display clock generator 414, and the main oscillator 406 and the main clock generator 408, so as to enable the selected oscillator and clock generator to provide a clock output, said enable output being selectively provided in response to receiving a combination of predefined key operation codes from the keyboard means 412 and in response to receiving predefined instruction codes from the processor 410. In an alternate embodiment, the controller means 400 includes the main oscillator latch 401 which is set in response to certain predefined combinations of instruction codes and key operation codes so as to enable the main oscillator 406 and main clock generator 408 and is further comprised of the display mode latch 402 which is selectively enabled in response to receiving predefined combinations of key operation codes from the keyboard means 412 and instruction codes from the processor 410 so as to enable the display oscillator 404 and the display clock generator 414. In a preferred embodiment, the display clock generator 414 is enabled in response to receiving an output from the display mode latch 402 (DM) at input $EN_1$ and in response to receiving an output from the main oscillator latch 401 (MO) at input $EN_2$. An advantage of design simplicity is gained in this way in exchange for a slight increase in active state on power for the calculator system. Additionally, in the preferred embodiment, the display clock generator 414 is enabled in response to receiving either the DM output from latch 402 or the MO output from latch 401. Furthermore, in the preferred embodiment, the display interface 416 may be controlled directly by the DM output from latch 402. Finally, the preferred embodiment yields a functional design benefit in that the display oscillator 404 may be used for scanning the keyboard means 412 and for generating keyboard interrupts when the calculator system is in the processor only mode (MO=1, DM=0, as described with reference to FIG. 10), to allow for off-key detection.

Figure 10:
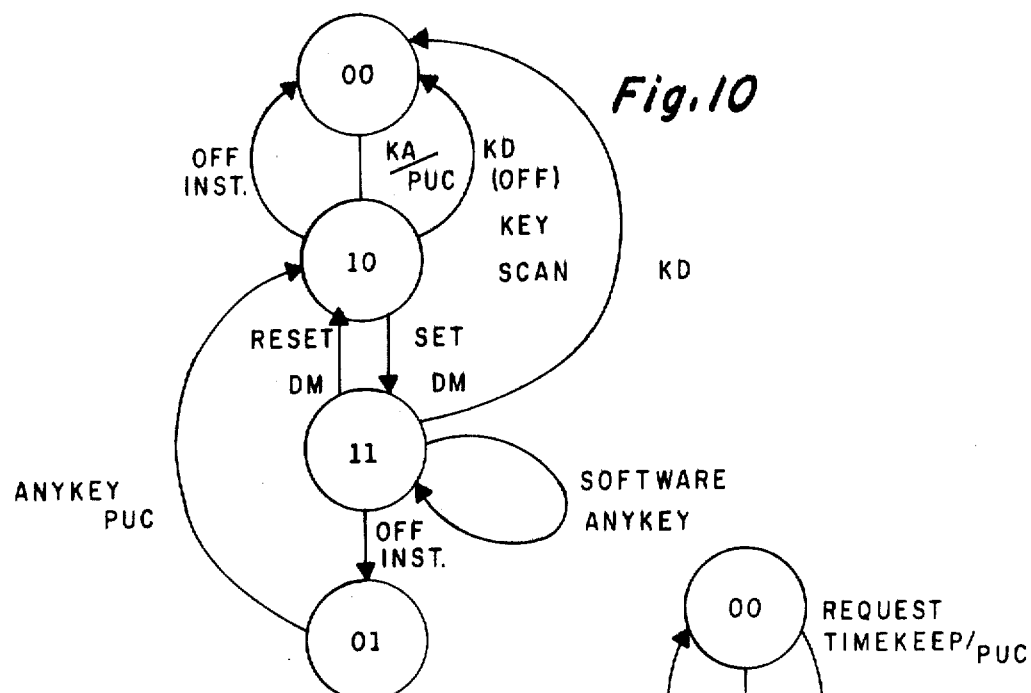
FIG. 10 is a state transition diagram for a four state mode control system of the preferred embodiment.

Referring to FIG. 10 and Table 1, it is seen that the system of FIG. 9 is a four state (mode) control system. In a preferred embodiment, the mode latches are responsive to independent direct control signals for the main oscillator latch 401 and for the display mode latch 402. Additionally, there is a control signal for the display speed control, which selectively multiplexes the display interface between the oscillator 406 (when the main oscillator latch 401 is set and the display mode latch 402 is reset) and the display oscillator 404 (when the main oscillator latch 401 is reset and the display mode latch 402 is set). In an alternate embodiment the display oscillator is always on except in the OFF mode state, and the display mode latch 402 acts only as a display speed control.

In the off mode, state 0 0, the calculator system is not in use. All clocks are at an non-cycling inactive level ($V_{SS}$) and the display is blank. Only a KA (on key operative key code) can alter the state of the machine from the off state. An on key operative key code will set the main oscillator latch 401 (MO), generating a power up clear signal (PUC) and bringing the system to a process only mode state 1 0 of FIG. 10 and Table 1. The processor 410 of FIG. 9 may then load the display interface 416 for the desired power up display, and then go to a display only mode, state 0 1 in FIG. 10 and Table 1, awaiting a keystroke operative key code.

In the display only mode, the state 0 1 of FIG. 10 and Table 1, the calculator is in a waiting state. The processor 410 is off and the display exhibits whatever was loaded into the display interface prior to entering this state. Periodically, the select/R lines which connect to the external keyboard display will be hardware interrupted and pulled to the active supply level ($V_{DD}$) for a first time interval, approximately 125 microseconds in a preferred embodiment. This will enable any keyboard entry sharing the select/R lines to provide for an operative key code to power up clear the machine to a process only mode (state 1 0 of FIG. 10 and Table 1) by setting the main oscillator latch 401 and resetting the display mode latch 402 (thereby generating a power up clear). The processor 410 is thereby placed in a fully active mode, so that in conjunction with the controller means 400, it can scan a keyboard 412 for the specific key pressed, debounce, and process the depressed key to determine the operative key code.

The process only mode, state 1 0 of FIG. 10 and Table 1, is the normal processing mode of the system in the preferred embodiment. This state always follows a power up clear. Display information is generally updated in this mode. Since the display interface section is running at processor speeds in the process only mode, that is, display clock generator 414 is responsive to main oscillator 406, the display will be blanked while in this mode. In an LCD preferred embodiment, the select/R buffers will be at binary logic levels ($V_{DD}$–$V_{SS}$) causing them to act as R lines for keyboard interface rather than as a display interface. Periodically, the select/R buffers will be hardware interrupted and pulled to $V_{SS}$, enabling the off key (KD) to reset the main oscillator latch 401 and thereby place the calculator in the off mode, state 0 0 of FIG. 10 and Table 1.

In the process and display mode, state 1 1 of FIG. 10 and Table 1, the display oscillator 404 and processor oscillator 406 may be enabled simultaneously or alternatively the processor oscillator 406 only may be enabled. This is particularly useful in the event that a long number crunching routine is going to occur and a blank display is undesirable for this length of time. The display interface 416 can be updated in the process only mode, and the system can then go to the process and display mode so that the display will exhibit previously updated data while the system is processing the number crunching routine. While it is possible for the processor 410 to communicate with the display interface 416 in this mode, this will generally not be done except for quick input/output and K line communication since enabling the main oscillator 406 only, will cause the display to blank. If a key is being held down after the system is finished processing it, the system will wait in the process and display mode (for calculators without the key rollover feature) for the key to be released before returning to the display only mode. This is accomplished by means of a software actuable any key latch within the controller means 400, which when set in response to instruction code set and reset signals will pull all the select/R lines to $V_{DD}$. The processor 410 may then quickly scan the K lines to determine if a key is being held down. This sequence can generally be done so quickly as to not affect the display. The select/R lines are interrupted and pulled to $V_{SS}$ in this mode also (every third common time for 125 microseconds in a preferred embodiment) so that an off key (KD) can place the calculator in the off mode.

Referring to Table 2, instruction codes for the set display mode latch (DM), reset display mode latch (DM), and off instructions are shown for the preferred embodiment.

Figure 11:
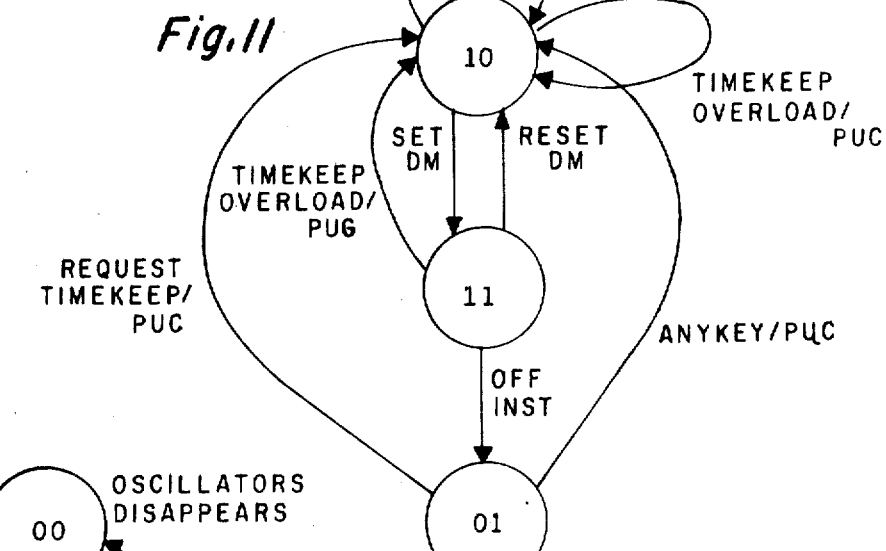
FIG. 11 is a state transition diagram for the four mode multipartitioned power controller system with timekeeping function.

Referring to FIG. 11, a state transition diagram for the multimode power controller for a calculator system with timekeeping is shown. The state transitions in a timekeeping application contain the same four modes as in the nontimekeeping application, as shown in FIG. 10, each mode serving the same function. A timekeeping overload register output will generate a power up clear and place the calculator system into the process only mode. In addition, as explained with reference to FIG. 10, the on key operative key code (KA) generates a power up clear so as to place the system in a process only mode. In the timekeeping system, an additional means for going from the off mode, state 0 0 in FIG. 11, to the process only mode, State 1 0 in FIG. 11, is accomplished in response to a request timekeep output from a counter latch in the timekeeping circuitry to provide for a periodic update of the timekeeping latches, every one second in a preferred embodiment. As described above with reference to FIG. 10, a set display mode oscillator latch instruction code from the controller 400 of FIG. 9 causes the system of FIG. 11 to go from the process only mode to the process and display mode, and a reset display mode latch instruction code from the controller 400 of FIG. 9 causes the system to go from a process and display mode to a process only mode. In addition, a timekeep overload output from a timekeeping overload latch causes a power up clear to occur and forces a state transition to the process only mode. The timekeep overload output forces a power up clear, but when the system is already in the process only mode, no state transition occurs. When the system is in the process and display mode, state 1 1 of FIG. 11, an off instruction code from the controller 400 of FIG. 9 forces the system to change states to the display only mode, state 0 1 of FIG. 11, as described with reference to FIG. 10. Any operative keycode (any key) forces a power up clear and a state transition from state 0 1 display only mode to state 1 0 process only mode, as described with reference to FIG. 10. In addition, in the system with timekeeping, a request timekeep output from the timekeep counter latch causes a power up clear to occur forcing a state transition from the display only mode 0 1 to the process only mode 1 0.

Referring to FIGS. 9 to 11, in a preferred mode, the display oscillator 404 when enabled is operative at a frequency of 50 Hz, and the main processor oscillator 406 when enabled is operative at a frequency of 1.6 MHz or alternatively at a frequency of 500 KHz, depending on the desired processor throughput.

The system of FIG. 10 may be described as a master system controller which provides both processing and display control functions. In addition, the system integrated circuit chip of FIG. 9 may exist without a display interface and therefore without a display oscillator. In this case, the system may be referred to as a slave controller system, as will be described with reference to the state transition diagram of FIG. 12.

Figure 12:
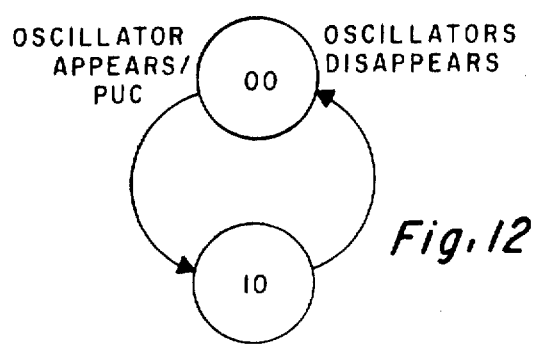
FIG. 12 is a state transition diagram of a slave controller system comprising a two mode multipartitioned system.

When the slave system is in an off state, state 0 0, the appearance of an oscillator input causes a power up clear to occur forcing the system to a process mode, state 1 0 FIG. 12. When the oscillator input is removed (disappears) the system is forced to an off state, state 0 0 of FIG. 12.

Referring to FIG. 13, a detailed schematic of an alternate embodiment of the circuit group 50 of FIG. 3a and more specifically of a clocked CMOS circuit group such as described with reference to FIGS. 7 and 8, is shown. When the power consumption controller 51 of FIG. 3a forces the circuit group 52 to a standby low power state, and clocks $\phi_A$, $\phi_B$ and $\phi_C$ of FIG. 13 are set to the active logic level non-cycling state, all clocked gates are transformed to static gates, and all sequential logic to combinational logic, thereby allowing imposition of a predefined output level. This requires that various critical input control nodes in the logic must be forced to a fixed state so as to force the combinational logic to output a predefined voltage level. For example, if it is desired that node 500 be at a logical high level during the standby state, node 502 must be set to a logical low level in the standby state. A preset output 504 from the power consumption controller 51 is coupled to one input of NOR gate 503. The output of NOR gate 503 is coupled to node 502, thereby effectively controlling the forced state output at node 500. When the preset output 504 is output at a high logic level during the standby state, the output of NOR gate 502 will be forced to a logic low level irrespective of the logic level of signal e at input 505 of NOR gate 503. Thus, node 502 is forced to a logic low level in direct response to a preset output 504 from the power consumption controller 51 and thereby forces a logical high level output at node 500, as desired, irrespective of the other input signal levels. Thus, in response to the preset output from the power consumption controller 51, a predefined output level is obtainable independent of the active mode inputs 505, 506, or 507 to the logic circuitry of FIG. 13. A significant advancement is achieved beyond the standby power dissipation modes of ratioless precharge discharge logic shown in FIG. 5, or the clocked CMOS logic is shown in FIG. 7 and 8, by the rationless clocked controlled state output logic as shown in FIG. 13. The system of FIG. 5 provides an output at a fixed voltage level (at the precharge voltage level) when the clocks are brought to an active state and the clocked CMOS of FIGS. 7 and 8 provides an output isolated from the applied voltages which may be random, while the output level of the clocked CMOS logic with controlled output level is at a predefined desired output level which may be different from the precharge level.

In the preferred embodiment, as shown in FIG. 13, when the clocks are inactive (in a non-cycling mode), a minimum power dissipation is achieved. When the clocks are held at the active level in the non-cycling mode and a preset output is applied to the sequential logic, the clocked CMOS logic becomes truly combinational (static) logic, providing a predefined output state in a minimum power dissipation mode.

When the clocks are cycling in the active mode, the preset output 504 from the power consumption controller 51 is at an inactive level (a low level in FIG. 13) so as to allow the logic to operate as sequentially clocked logic in the desired manner.

Although the invention has been described with reference to specific embodiments, this description is not meant to be construed in a limiting sense. Various modifications of the disclosed embodiment, as well as other embodiments of the invention, will become apparent to persons skilled in the art upon reference to the description of the invention. It is, therefore, contemplated that the appended claims will cover any such modifications or embodiments as fall within the true scope of the invention.

TABLE 1

TI-8015
OSCILLATOR CONTROL IN VARIOUS MODES

| MO | DM | COMMENT | DISPLAY | PROCESSOR |
|---|---|---|---|---|
| 1 | 1 | PROCESS & DISPLAY | 50Hz | 1.6M/500K |
| 1 | 0 | PROCESS ONLY | 1.6M/500K | 1.6M/500K |
| 0 | 1 | DISPLAY ONLY | 50Hz | OFF |
| 0 | 0 | OFF | OFF | OFF |

TABLE 2

| SET DM | = OAB5 |
|---|---|
| RESET DM | = OAB4 |
| OFF INST. | = 003E |

We claim:

1. An electronic data processing system comprising:
   (a) operator input means having means for generating an ON signal, an OFF signal and a plurality of operation signals; and
   (b) electronic circuit means having first and second oscillator means and first and second sets of data processing operational circuits for performing data processing operations in accordance with said operation signals and for generating mode signals including:
      (i) first clock pulse generator means controlled by said first oscillator means, responsive to predetermined signals from said operator input means and to first predetermined mode signals from other portions of said electronic circuit means selectively to operate in a standby, low power consumption mode, or to operate in an active mode to supply first clock pulses to control operation of said first set of data processing operational circuits; and
      (ii) second clock pulse generator means controlled by said second oscillator means, responsive to predetermined signals from said operator input means and to second predetermined mode signals from other portions of said electronic circuit means selectively to operate in a standby, low power consumption mode or to operate in an active mode to supply second clock pulses to control operation of said second set of data processing operational circuits.

2. The data processing system as recited in claim 1, wherein said second clock pulse generator means is further controlled by said first oscillator means responsive to predefined signals from said operator input means and to alternate predetermined mode signals from said electronic circuit means for operating in a standby, low power consumption mode or in an active mode to supply second clock pulses to control operation of said second set of data processing operational circuits.

3. The data processing system as recited in claim 1, further comprising:
   (a) an output means for generating an operator perceivable output; and
   (b) controller means connected to said first oscillator means, said second oscillator means, said first clock pulse generator means, said second clock pulse generator means, and said operator input means, said controller means comprising:
      (i) means for selectively operating each of said first and second oscillator means, and each of said first and second clock pulse generator means in said standby low power consumption mode in response to receiving an OFF signal;
      (ii) means for selectively operating said first oscillator means and said first clock pulse generator means in said standby low power consumption mode and for selectively operating said second oscillator means and said second clock pulse generator means in said active mode in response to receiving an ON signal;
      (iii) means for selectively operating said first oscillator means, said first clock pulse generator means and said second clock pulse generator means in said active mode and for selectively operating said second oscillator means in said standby, low power consumption mode in response to receiving one of said plurality of operation signals; and
      (iv) means for selectively operating said first oscillator means, said first clock pulse generator means, said second clock pulse generator means, and said second oscillator means in said active mode in response to mode inputs indicative that said first set of data processing operational circuits is performing a data processing operation.

4. The data processing system as recited in claim 3, wherein:
   said first set of data processing operational circuits includes arithmetic logic means; and
   said second set of data processing operational circuits is coupled to said output means and includes an output interface means.

5. An electronic data processing system comprising:

(a) operator input means having means for generating an ON signal, an OFF signal and a plurality of operation signals; and (b) electronic circuit means having an OFF mode, a process only mode, a display only mode and a process and display mode, comprising:

(1) controller means, connected to said operator input means, including means for selectively generating inactive first enable, first control, second enable and second control output when said electronic circuit is in the OFF mode, means for generating active first enable, first control and second control outputs and inactive second enable output when said electronic circuit is in the process only mode, means for generating active second enable and second control outputs and inactive first enable and first control outputs when said electronic circuit is in the display only mode, and means for generating active first enable, first control, second enable and second control outputs when said electronic circuit is in the processor and display mode;

(2) oscillator means, connected to said controller means, including first oscillator means for selectively generating a first frequency signal in response to receiving said active first enable output and operating in a low power standby mode in response to receiving said inactive first enable output, and second oscillator means for selectively generating a second frequency signal which has relatively low frequency as compared with said first frequency in response to receiving said active second enable output and operating in a low power standby mode in response to receiving said inactive second enable output;

(3) first clock generator means, connected to said controller means and said first oscillator means, for selectively generating first clock outputs in a cycling state at said first frequency in response to receiving said active first control output and said first frequency signal and generating a predefined steady state output in response to receiving said inactive first control output; and (4) second clock generator means, connected to said controller means, said first oscillator means and said second oscillator means for selectively generating second clock outputs in a cycling state at said first frequency in response to receiving said active first control output, said inactive second control output and said first frequency signal, generating second clock outputs in a cycling state at said second frequency in response to receiving said active second control output, and generating a predefined steady output in response to receiving said inactive first control output and said inactive second control output.

6. The data processing system of claim 5 wherein said electronic circuit further comprises:

processor means, connected to said first clock generator means, for selectively executing data processing functions corresponding to the received operation signals in response to receiving the first clock outputs in a cycling state; and display interface means connected to said second clock generator means, for selectively generating operator perceivable outputs representative of the information to be output in response to receiving the second clock outputs in a cycling state.

* * * * *